INVENTOR
HENRY A. SHERWOOD
BY
Arthur A. March
ATTORNEY

INVENTOR
HENRY A. SHERWOOD
BY Arthur A. March
ATTORNEY

INVENTOR
HENRY A. SHERWOOD
BY Arthur A. March
ATTORNEY

Oct. 13, 1970 H. A. SHERWOOD 3,533,634

PHONOGRAPH RECORD PLAYER

Filed June 29, 1966 4 Sheets-Sheet 4

INVENTOR
HENRY A. SHERWOOD

BY Arthur A. March

ATTORNEY

United States Patent Office 3,533,634
Patented Oct. 13, 1970

3,533,634

PHONOGRAPH RECORD PLAYER

Henry A. Sherwood, Short Hills, N.J., assignor, by mesne assignments, to Lorraine Industries, Inc., Bridgeport, Conn., a corporation of Connecticut Filed June 29, 1966, Ser. No. 564,488
Int. Cl. G11b 3/06, 17/06
U.S. Cl. 274—14 21 Claims

ABSTRACT OF THE DISCLOSURE

A phonograph record player comprises a housing having record turntable means therein adapted to hold and rotate a record. Motor means within the housing are provided with a drive shaft and transmission means for transmitting the driving motion of the motor to the turntable. The motor means is activated by a portable energy source situated within the housing. Means for regulating the speed of the motor are connected with the energy source, the connecting means forming an energy transmission circuit, the circuit being opened and closed by switching means. A recordplaying needle is linked to sound reproducing means. Pivoting means are associated with the means holding the needle.

The present invention relates to phonograph record players and more particularly to a relatively small phonograph record player with novel economical features.

Heretofore, when providing miniature phonograph record players, complex and expensive constructions were utilized which were very difficult to produce and assemble. In addition, the reproduction tone was not of entirely satisfactory quality and because of the necessity for using many parts such phonograph record players were quite subject to break downs.

It is therefore an object of the present invention to provide a phonograph record player which is completely portable but which utilizes simple working parts.

Still a further object of the present invention is to provide a phonograph record player which is very simple to operate with good reproduction tones.

A further object of the present invention is to provide a phonograph record player which is of structurally simple design but is nevertheless sturdy and economical to produce.

Still a further object of the present invention is to provide a phonograph record player possessing maximum reliability of operation.

Still another object of the present invention is to provide a phonograph record player capable of protecting the phonograph contents against shock and vibrations possible from manual handling of the apparatus.

A still further object of the present invention is to provide a phonograph record player, requiring a minimum amount of maintenance for retaining the same in proper operation condition.

The novel features of the phonograph appear in the appended claims. An exemplary detailed construction of the invention, however, as well as other objects and advantages are described in the following specification taken in conjunction with the accompanying drawing in which:

Figure 1:
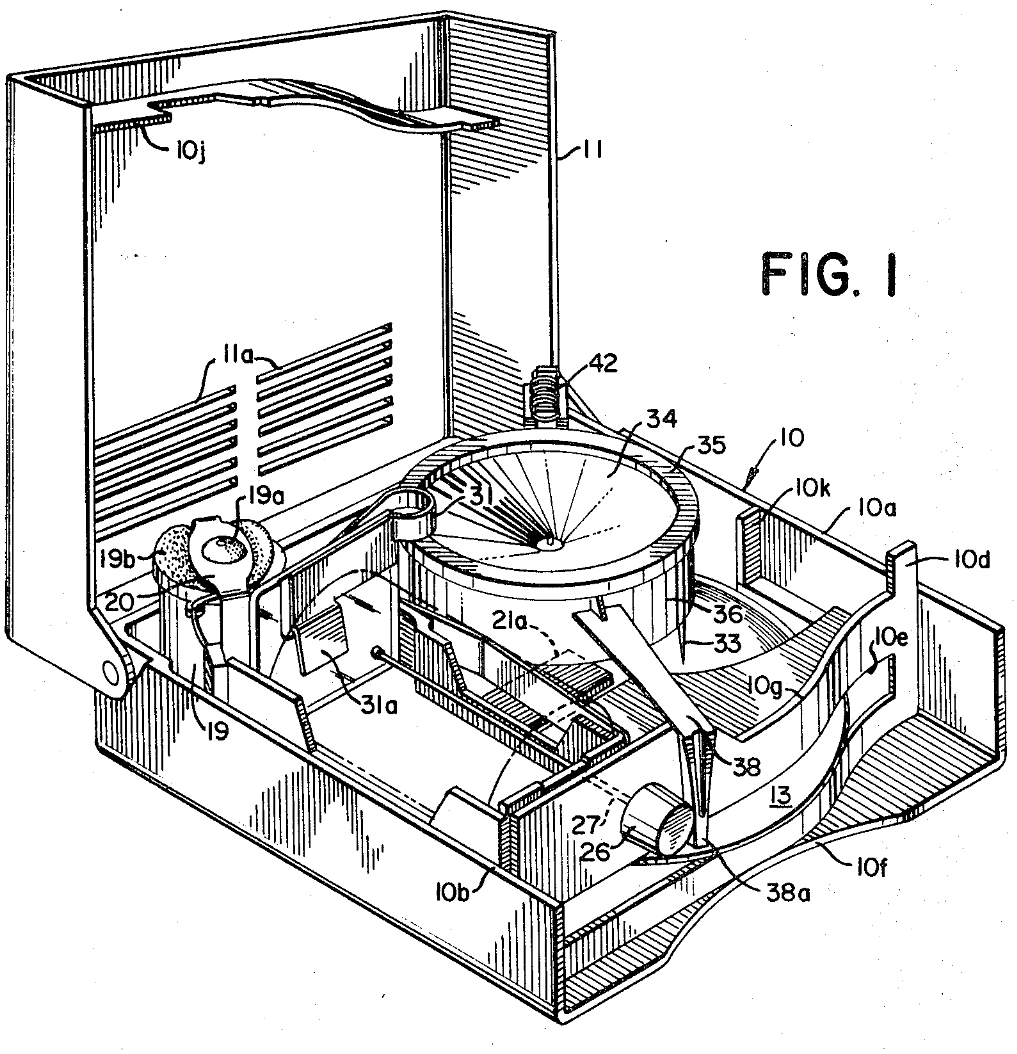
FIG. 1 is an isometric view of the phonograph showing the interrelationships of the operating elements of the apparatus.
Figure 2:
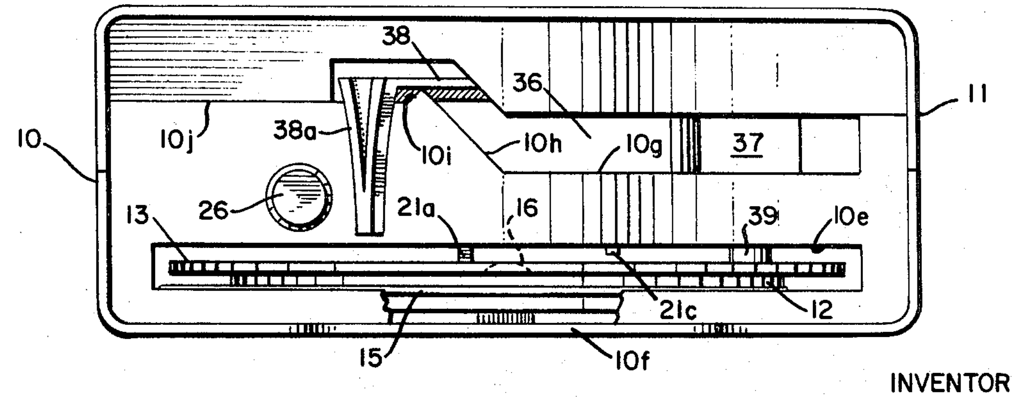
FIG. 2 is a front view of the apparatus of FIG. 1, and shows the phonograph in the non-operating or stowed position.

Referring to the drawing, the record-playing apparatus is contained within the housing 10 which serves as the base support for the operating elements of the apparatus. Hinged to the rear of the housing 10, is a cover 11 which protects the record-playing mechanism under normal conditions of use and handling, and allows, at the same time, access to the operating parts when necessary. The cover contains louvers which permit the sound from the record to be transmitted externally when the cover is closed. At the bottom of the housing 10, is a turntable 12 which supports the record 13. The turntable 12 rotates about the shaft 14 which is fixed to the base or bottom of the housing 10.

Figures 6, 7, 8, 9:
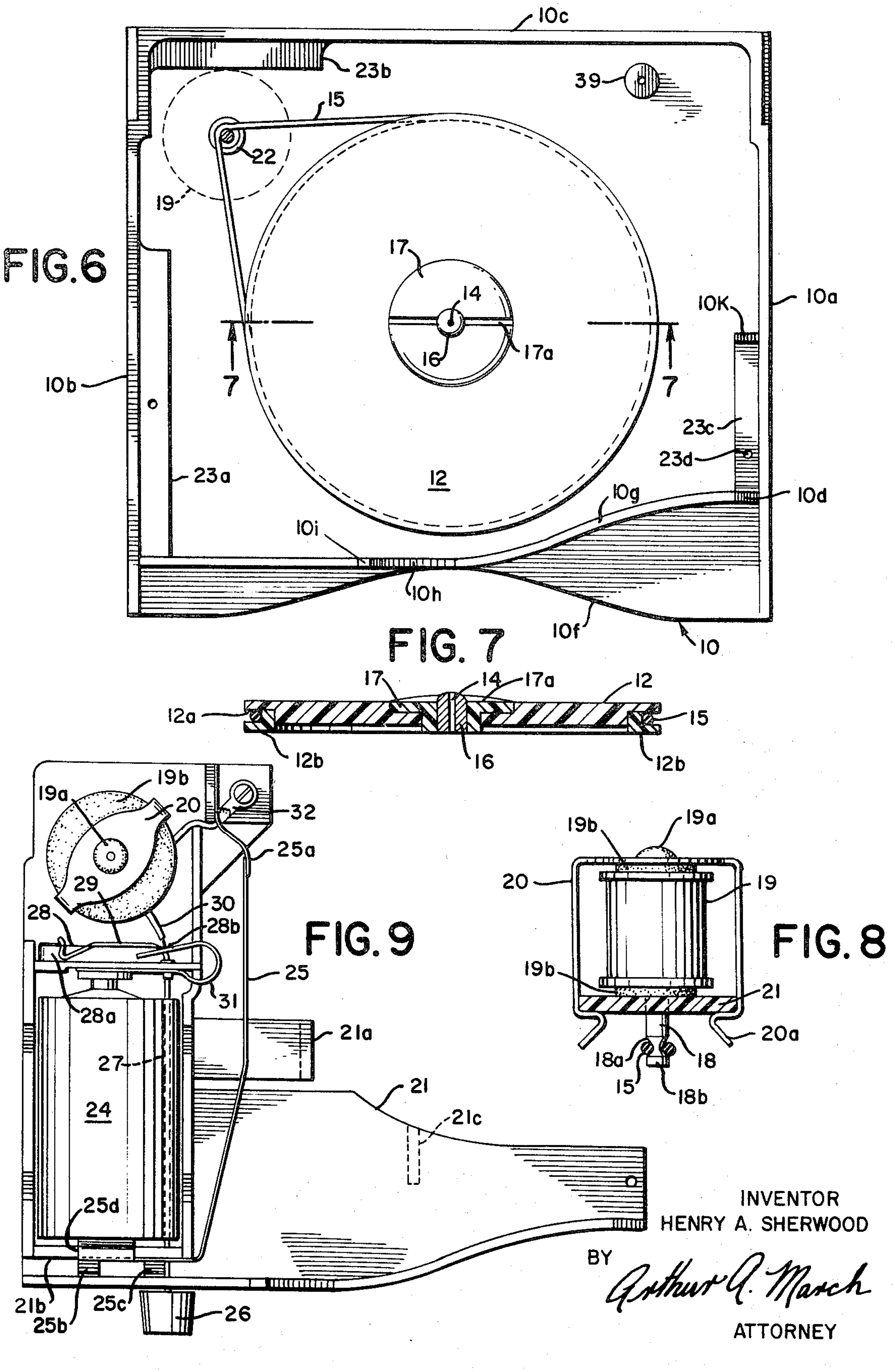
FIG. 6 is a top view of the phonograph of FIG. 1, and shows the means by which the phonograph record is supported and rotated.
FIG. 7 is a sectional view taken along the line 7—7 in FIG. 6, and shows the construction of the turntable which supports and moves the record while it is being played.
FIG. 8 shows the means by which the motor operating the turntable is fastened to its supporting bracket.
FIG. 9 is a top view of FIG. 1 and shows the assembled construction of the electrical components upon an L-shaped bracket.

The turntable is in the form of a pulley having a groove 12*a* penetrating its rim. Within this groove rides a belt 15 which serves to drive the pulley or turntable about the stationary shaft 14, as shown in FIG. 6. At the center of the turntable, is a bushing 16 which contains the hole 16*a* that mates with the shaft 14. The bushing 16, made of wearable material, is held within a collar 17 fixed to the turntable. The collar 17 may be attached to the turntable through means of a press fit, cementing process or other commonly-known fastening procedure. The collar 17 has also a radial projection 17*a* which serves as a key by which the record is driven by the turntable. The record 13 has a corresponding slot which admits the projection 17*a* and thus allows the record to lie completely flush with the surface of the turntable, and to be driven by same. In the manufacture of the turntable, it is possible to construct the collar 17 integral with the turntable as, for example, from a single member of molded material. When using both sides of the record, the radial slots in the record may be angularly displaced from one another so that the slots may be made adequately deep without penetrating entirely through the thickness of the record material. It is also completely feasible to reverse the design by providing radial projections at the record center and corresponding slots in the turntable. In order to avoid a a manufacturing problem resulting from the groove 12*a*, the latter may be formed by constructing the turntable of two members 12 and 12*b*. These two members may be joined by press-fitting or any one of the commonly-known joining methods.

To drive the turntable, the belt 15 connects the latter to the shaft 18 of a motor 19. The shaft 18 contains a groove 18*a* in which the belt is wedged. The end of the shaft, 18*b*, rides within a cup-shaped opening 22 associated with the base of the housing 10. The motor 19 is mounted in position by means of the strap 20 made of spring material. As shown in FIG. 8, the front face of the motor rests vertically downward upon the supporting bracket 21. The bracket contains a hole through which the shaft of the motor may pass. The U-shaped strap 20 is firmly in contact with the rear face or end of the motor, and by passing around and beneath the bracket by means of its curved ends 20*a*, the strap holds the motor securely in place. The rear end of the motor may, in addition, possess a projection 19*a* passing through a corresponding opening in the strap to provide further gripping surface by which the strap retains the motor body. With this particular design of the strap, the motor is assembled in place by merely snapping the ends 20*a* of the strap around the bracket 21. In order to realize improved quality in the tone reproduced from the record, it is desirable to isolate the motor 19 from the bracket 21 and the phonograph housing. Such isolation can be accomplished through the insertion of a cushion 19*b* between the motor and the bracket 21 as well as between the motor and the strap 20. Such cushions may be made, for example, of layers of foam rubber or plastics.

The housing 10 has enclosing side walls 10*a* and 10*b*, and rear wall 10*c*. The front wall 10*d* has a slot 10*e* through which the record to be played may be inserted. The turntable is located with respect to the front wall so that when the record is properly located on the turntable, it projects through the slot 10*e* by an amount which permits the rim of the record to be gripped between the fingers of one's hand. In this manner, a record may be readily removed or placed upon the turntable. The side walls 10*a* and 10*b* project past the front wall to serve as a means of protecting against damage, the projecting portion of the record, in the event the apparatus or playing assembly is accidentally dropped. When the cover 11 is closed, all operating elements of the apparatus are securely enclosed and protected against external disturbances. The base of the housing 10 is curved inward as shown by the profile 10*f*, to provide free access for one's fingers when gripping the rim of the record. The front wall 10*d*, furthermore, is curved inward to furnish additional gripping surface of the record by exposing an additional amount of the rim.

Supporting post 23*a*, 23*b*, and 23*c* are associated with the side and rear walls. These posts form the base support for an L-shaped bracket which provides a second level for mounting the electrical components of the apparatus. This arrangement permits compact packaging of the operating elements and miniaturization of the apparatus.

Figures 10, 11, 12:
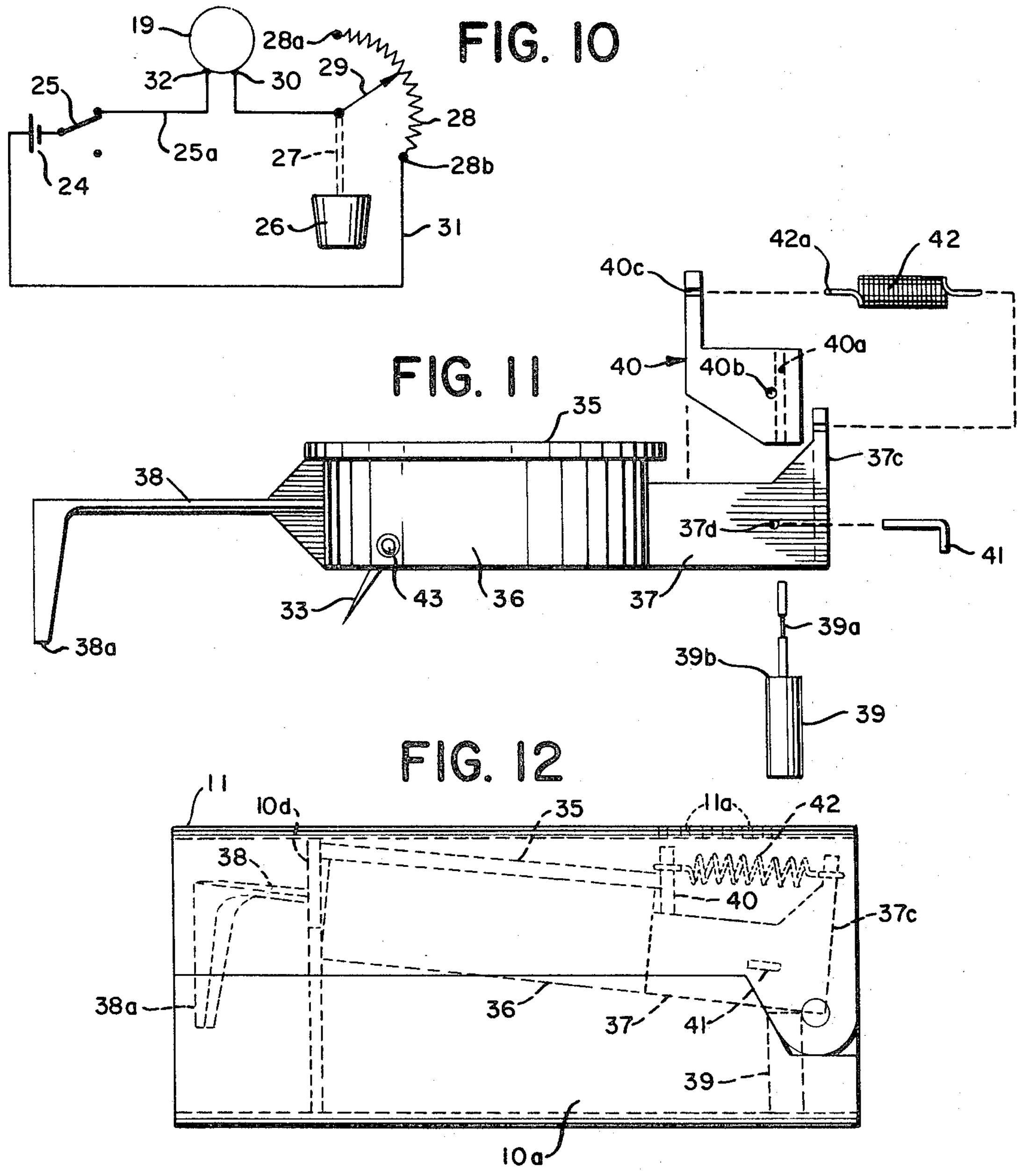
FIG. 10 is an electrical schematic diagram of the motor driving and speed control circuit.
FIG. 11 is a front view taken along line 11—11 in FIG. 3 and shows the functional relationships of the elements which provide pivoting and supporting features to the means for holding the record-playing needle.
FIG. 12 is a side view showing the spatial relationship of the record sound reproducing unit with respect to the phonograph housing.

The L-shaped bracket 21 and parts assembled to it are shown in FIG. 9. The bracket serves as the mounting surface for the driving motor 19, battery 24, control switch 25, and speed control elements 26, 27, 28, 29, and 31. All electrical components shown interconnected in FIG. 10, are mounted upon this bracket 21. In this manner the bracket may be removed from the housing 10 without having to sever any electrical connections. This particular design also simplifies considerably the assembly of this unit, since all electrical wiring may be done on a self-contained platform, which in the embodiment illustrated is a separate and distinct platform above the platform comprising the turntable and drive. The electrical design also results in increased reliability of the unit. Thus, since no electrical leads enter or leave the bracket assembly, it is unnecessary to include any type of connector between the housing and the bracket. Connectors that function in this manner do much to decrease the reliability of the electrical arrangement of which they are a part.

A protrusion 21*c* is provided on the underside of the L-shaped bracket to deflect the record upon its insertion thereby preventing its touching the needle and becoming scratched.

The manner in which the driving motor 19 is operated is clearly illustrated in the electrical schematic diagram of FIG. 10. A battery 24 is used as the energy source for driving the motor. The battery may be the commonly-known single cell used in various portable electrical appliances. An on-off switch 25 serves to connect or disconnect the battery depending upon whether the record player is in use or not. The switch also serves to disconnect the battery when the needle is near the center or end position of the record. At this point the outer diameter of the sound transducer housing 36 contacts the switch 25 and causes the circuit to open.

A terminal and conductor 25*a* connects the battery to one of the terminals 32 of the motor 19. The motor may be of the commonly-known direct-current type adapted to operate from a battery cell. Motors of this description and suitable for operating on, for example 1.5 volts, are in common use. The other terminal 30 of the motor, is connected to a sliding contact arm 29 which maintains electrical contact with a resistance element 28. The arm 29 may be caused to rotate and slide along the resistance element 28, through rotation of the knob 26 which is coupled to the arm by means of the shaft 27 to form an L-shaped contact rod. The mechanical relationship of assembly portion may be seen by referring to FIG. 9. The combination of the elements 26, 27, 28, and 29 functions as a potentiometer for the purpose of controlling the speed of the motor. In its simplest form, the resistance element 28 may be a single wire of resistive material. The terminal 31 connecting the resistance element 28 to the battery 24, serves to complete the electrical circuit for driving and controlling the motor.

Speed control of the motor is achieved by varying the amount of resistance in the motor circuit. When the arm 29 contacts the resistance element 28 at is free or floating end 28*a*, the maximum amount of resistance is introduced into the circuit, and the motor will operate at its slowest speed. This results from the condition that the resistance element 28 is in series with the motor winding, and accordingly the battery voltage is distributed across the motor and element 28 in proportion to their resistance values. By turning the control knob 26 so that the arm 29 moves toward terminal 28*b*, the amount of resistance due to element 28 is decreased, and the voltage across the motor is correspondingly increased. Such increase in the motor voltage operates to increase the motor speed. When the arm 29 is located at the terminal 28*b*, no resistance external to the motor is included in the circuit, and as a result the motor rotates at its maximum speed.

The control knob 26 is located at the front wall 10*d* so that it is readily accessible for adjustment purposes. The shaft 27 to which the knob is attached, is mounted in bearings associated with the bracket 21, and etxends past the battery 24 as shown in FIG. 9. The contact arm 29 is fixed to the shaft 27 at the opposite end of the control knob 26. The arm 29 may be made of conducting spring material to maintain it in constant contact with the resistance element 28 throughout its path of motion. The resistance element 28 is connected to a terminal 28*a* and the element for easy assembly is contained by means of an eyelet near the bottom of the bracket 21, and to the terminal 28*b* located near the top surface of the battery lying in its designated slot. To move from terminal 28*a* to terminal 28*b*, the arm 29 may rotate approximately 90°. In addition to being a binding post for the resistance element 28, the terminal 28*a* also serves as a stop which prevents the arm 29 from sliding off the free end of the resistance element.

The on-off switch arm 25 serves also as a battery terminal. The switching arm is supported on a projection 21*b* integral with the bracket 21. Two bent-up lugs 25*b* and 25*c* on the arm are located between the space of the front wall 10*d* and the projection 21*b*, and thus retain the arm firmly in position. The switch arm 25 has also a bent-over leaf 25*d* which serves as a terminal in electrical contact with the battery. The terminal leaf 25*d* is bent-over the top surface of the projection 21*b* as shown in FIG. 9. and therefore provides additional support to the switch arm 25. The entire switch arm 25 including the leaf 25*d* is made of conducting material so that any potential appearing at the battery terminal is transferred along the arm. When the record-playing apparatus is in use, the arm 25 is in contact with the terminal 25*a* leading to the motor. Accordingly, when in the position shown in FIG. 9, the motor circuit is completed. The arm 25 may include a longitudinal slit (not shown) located at the center of its width so as to make the arm fork-shaped. This design of the arm where it is in contact with the terminal 25*a*, may result in more reliable contact operation. The bracket 21 includes a record hold down finger 21*a* which has a downward projection at its tip. According to the invention this finger is offset from the center of the record to counteract the pressure of the stylus on the record. In the absence of the offset finger this pressure would tend to tilt the record out of position and make it unplayable. The L-shaped bracket 21 is fastened to the posts 23*a* and 23*c* by means of the threaded holes 23*d* provided for this purpose. Through the use of three posts 23*a*, 23*b* and 23*c*, complete support of the bracket 21 is realized since three points determine a plane.

The sound characteristics of the record are reproduced by means of the needle 33 riding within the grooves cut into the record. The vibrations of the needle are transferred to the membrane 34 held by the fastening ring 35 to the top of the transducer housing 36. The membrane is linked to the needle and functions as a horn which amplifies the needle vibrations in the manner commonly known to phonograph art. A screw 43 provided at the side of the housing 36, permits interchange or replacement of the needles 33.

Figure 13:
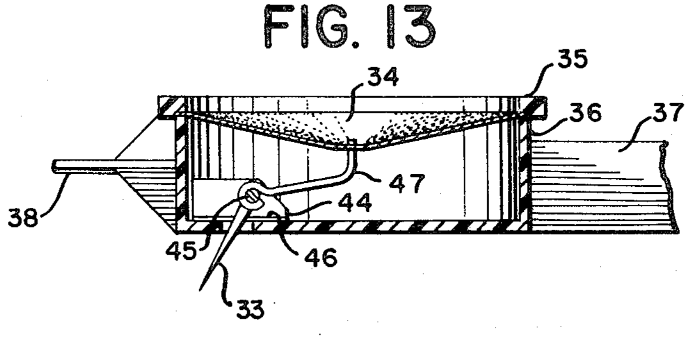
FIG. 13 is a sectional view taken along line 13—13 of FIG. 3, and shows the internal arrangement of the sound reproducing unit.

An example of the manner in which the membrane 34 is linkable to the needle 33, is illustrated in FIG. 13. A fork-shaped base 44 is secured to the housing 36. The base 44 serves as a bearing means for a rotatable shaft 45. The base includes two walls each one of which supports one end of the shaft 45. Only one of these walls is shown in FIG. 13 due to the manner in which the sectional view is taken for the sake of clarity. The walls 44 are connected to each other by means of a cross member 46 secured to the bottom of housing 36, and thus form a fork-shaped base. From the viewpoint of optimum design, it is desirable that this cross member be of rectangular shape having a width substantially equal to its length. An amplifying lever 47 connects the center of the membrane 34 to the shaft 45 which supports the needle 33. The amplifying lever is secured to the shaft 45 through press-fitting the circular loop to the latter. The circular loop is formed from the end of the amplifying lever. Any motion of the needle 33 about the shaft 45, therefore, is amplified by the lever 47 and transmitted directly to the membrane 34. Amplification of the needle motion results from the condition that the length of the lever with respect to the cetner of shaft 45 exceeds the length of the needle with respect to this same point.

A resilient material (not shown) may be interposed between the membrane and the space within the housing 36. This resilient material made of foam rubber for example, serves as a damper and also raises and biases the membrane to improve the frequency response.

The housing 36 is supported by an arm 37 having two sides 37*a* and 37*b* fixed at one end to the housing, and held together at the other end by the separating element 37*c*. One of a number of functions of the arm, is to produce a pivoting action by which the needle 33 is properly maintained in contact with the record when the apparatus is in use. Accordingly, the arm must allow for horizontal movement of the housing as the needle 33 travels from the rim of the record to its center. The arm 37 must, in addition, allow for vertical movement of the housing as the needle is lifted from the record and the housing 36 is located in its non-operating position.

Figure 3:
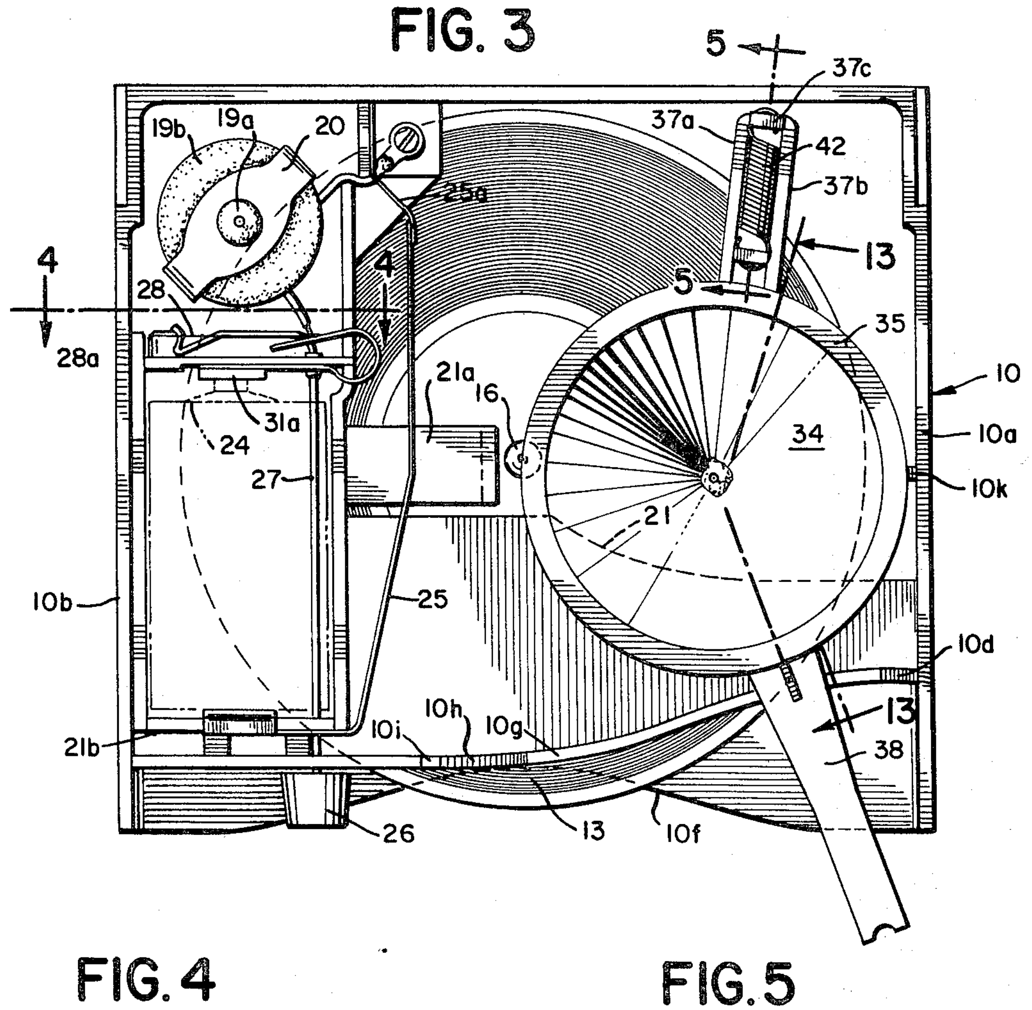
FIG. 3 is a top view of the apparatus of FIG. 1 and shows the phonograph in the operating or recordplaying position.
Figure 4:
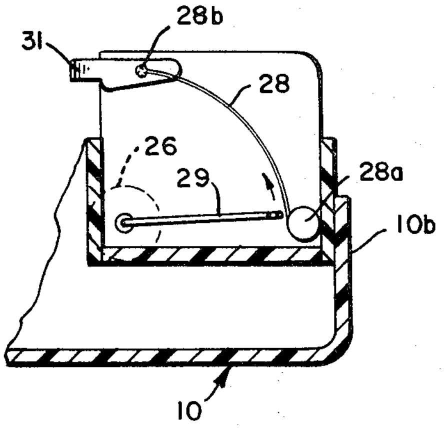
FIG. 4 is a sectional end view taken along line 4—4 in FIG. 3, and shows the construction of the means for controlling the speed of the phonograph.

The needle 33 and consequently the housing 36 may be manually positioned about the record by gripping the membrane actuating arm or lever 38 fixed to housing 36. The lever has an L-shaped end 38*a* by which the lever may be comfortably gripped or lifted. It will be noted that the L-shaped end 38*a* is somewhat elongated. This is to provide a physical barrier against inadvertent or accidental removal of the record 13 from the slot 10*e* when the record is being played. When the apparatus is in use, the housing 36 and lever 38 are in the position illustrated by FIG. 3 in which the arm lies above the horizontal edge 10*g*. This horizontal edge terminated in an upward ramp 10*h* which forms a peak in association with the oppositely oriented ramp 10*i*. A second horizontal edge 10*j* adjoins the ramp 10*i*.

According to the present invention, to move the sound assembly comprising the housing 36 and the parts connected thereto, the lever 38 is lifted to remove the needle 33 from the record. For purposes of placing the sound assembly in the nonoperating or stowed position, the lever 38 is brought in contact with the ramp 10*h* and caused to bear against the latter. This action causes the lever to ride up the ramp, pass over the ramp 10*h* and the peak 10*i*, and come to rest upon the lower horizontal edge 10*j*. This procedure causes, moreover, the locking of the sound assembly in the stowed position. The locking feature results from the condition that during the period of time after lever 38 rides up ramp 10*h* it rests on the lower horizontal edge 10*j* and is prevented from inadvertent movement by ramp peak 10*i*. According to the invention the hold-down spring 31 functions as a battery terminal as a result of the bent leaf 31*a*. This assembly provides a simple and economical electric connection between the battery and the resilient element 31 is also joined to the resistance element 28 as described supra.

When the sound assembly is thus brought into the non-operating or stowed position, the body of the housing 36 bears against the switch arm 25 and causes, thereby, the arm to break electrical contact with the terminal 25*a*. As a result, the motor circuit is opened, and the battery cannot be inadvertently drained when the apparatus is not in use. The side wall 10*a* includes a projection 10*k* against which the housing 36 may be brought to bear at the commencement of the playing of the record. The projection 10*k* provides by which the needle 33 may be located, with ease, at the beginning of the record.

Figure 5:
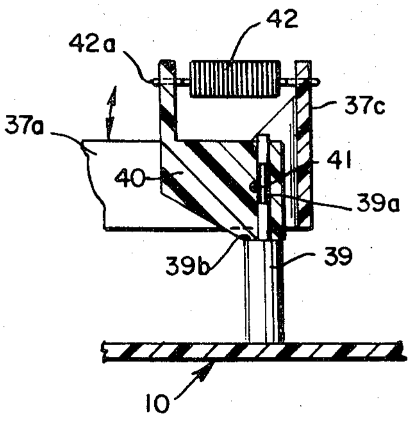
FIG. 5 is a fragmentary sectional view taken along line 5—5 in FIG. 3, and shows the assembled construction of the means by which the record-playing needle support is pivoted.

At the end of the arm 37, the sound assembly is pivoted to permit movement of the needle 33 across the plane of the record, as well as in the plane perpendicular to the record. This freedom of motion of the needle is necessary so that it may follow the sound characteristics of the record from beginning to end. The individual elements which combine to form the pivot of the arm 37, are shown in FIG. 11. Their assembled arrangement is evident from FIG. 5.

The pivot shaft 39 is fixed to the base of the housing 10 as shown in FIG. 6. The shaft consists of two sections of different diameters, the smaller of which has a neck 39*a*. The arm support 40 contains a hole 40*a* which is slideable over the smaller diameter of the pivot shaft 39. When assembled to the pivot shaft, the arm support 40 rests upon the shoulder 39*b* of the larger diameter of the shaft. The thickness of the element 40 corresponds to the width of the space between arms 37*a* and 37*b*. The arm comprises a fork-like base which is approximately as long as it is wide. The arm support 40 is situated within this space between arms 37*a* and 37*b*, and secures the latter in place by means of an L-shaped pin 41. The pin passes through holes 37*d* in both arms 37*a* and 37*b*, and through the hole 40*b* in the support element 40. The holes 37*d* and 40*d* are arranged so that they intersect the hole 40*a* at the location of the neck 39*a*. In this manner, the arm 37 and support 40 cannot slide up and out of their assembled positions when the pin 41 is in place. The pin is L-shaped to provide means by which it may be easily gripped for removal or insertion as desired. The separating element 37*c* and support 40 include notches 40*c* for retaining the ends 42*a* of a tension spring 42.

When properly assembled, and the base of the housing 10 is located on a horizontal surface, the support 40 is restricted to rotation in a horizontal plane. The arm 37, on the other hand, is confined to rotational movement in a vertical plane. Through their combined movements, therefore, the arm and its support element provide the required freedoms of motion of the needle 33. Since the support 40 cannot rotate in the vertical plane, the action of the spring 42 is such that it produces a torque upon the arm 37 which tends to maintain the needle in contact with the record. A positive moment applied to the arm 37, in this manner, avoids shattering effects as the needle follows the cut grooves of the record.

FIG. 12 illustrates the relationship between the hinged cover 11 and the fastening ring 35 when the housing 36 is in the stowed position. In this latter position the needle 33 must be sufficiently removed from the turntable so as to assure adequate space for interchanging records. This condition requires that the housing 36 be raised above the turntable. At the same time it is desirable to maintain the record player as compact as possible, and therefore, the arrangement is designed so that the fastening ring edge lies as close as practically possible to the cover 11 when the housing 36 is in stowed position. Within the confinements of this condition, the louvers 11*a* are located as far as possible from the center of the ring 35 or membrane 34.

As will be understood from the foregoing description of an example of this invention, there is provided a two-level structure in which the motor and battery are on one level and the sound box and turntable on the level below. This provides a record player of relatively low silhouette having a width substantially the same as the diameter of the record being played, no matter how small, and a height substantially the same as the height of the sound box. This structural arrangement provides an extremely compact, efficient, inexpensive but well toned record player.

What is claimed is:

1. A phonograph record player comprising, in combination, a housing for enclosing and supporting said phonograph;

a record turntable means situated within said housing and adapted to hold and rotate a record;

motor means situated within said housing said motor means having a drive shaft for driving said turntable means;

transmission means for transmitting the driving motion of said motor means to said turntable means;

a portable energy source situated within said housing for driving said motor means;

regulating means for regulating the speed of said motor means;

connecting means for interconnecting said energy source and said regulating means with said motor means, and forming an energy transmission circuit thereby;

switching means situated within said housing for opening and closing said circuit;

a record-playing needle for following the sound characteristics of a record;

means for holding said needle, said means supporting sound reproducing means linked to said needle and amplifying the sound characteristics followed by said needle;

mounting means located above said turntable for mounting said motor means and said energy source;

and pivoting means associated with said holding means for permitting said needle to be variable positioned said pivoting means being situated within said housing, and wherein said housing includes side walls, a rear wall, and a front control wall, said front wall having a slot through which a phonograph record may be inserted and removed and said front wall including an opening for an L-shaped lever, said lever connected to said means for holding and supporting said needle and being adapted to move the record playing needle, said L-shaped lever being provided with a relatively enlongate off-set portion displaced in front of said slot to prevent inadvertent removal of the record when said record is in playing position.

2. A phonograph record player comprising, in combination, a housing for enclosing and supporting said phonograph;

a record turntable means situated within said housing and adapted to hold and rotate a record;

a motor means situated within said housing said motor means having a drive shaft for driving said turntable means;

transmission means for transmitting the driving motion of said motor means to said turntable means;

a portable energy source situated within said housing for driving said motor means;

regulating means for regulating the speed of said motor means;

connecting means for interconnecting said energy source and said regulating means with said motor means, and forming an energy transmission circuit thereby;

switching means situated within said housing for opening and closing said circuit;

a record-playing needle for following the sound characteristics of a record;

means for holding said needle, said means supporting sound reproducing means linked to said needle and amplifying the sound characteristics followed by said needle;

mounting means located above said turntable for mounting said motor means and said energy source;

and pivoting means associated with said holding means for permitting said needle to be variable positioned, said pivoting means being situated within said housing and wherein said housing includes side walls, a rear wall, and a front control wall, said front wall having a slot through which a phonograph record may be inserted and removed; said means for holding and supporting said needle includes a lever projecting through said front wall and above said slot; said speed regulating means includes a control knob by which said speed may be varied, said control knob being located at said front wall outside of said housing and being coupled to said speed regulating means by a control shaft protruding through said front wall, said control shaft supporting said knob; said side walls include means for hinging a cover to said housing to aid in the protection of the contents thereof, said side walls extending past said front wall for the protection of members projecting through said front wall.

3. A phonograph record player comprising, in combination, a housing for enclosing and supporting said phonograph;

a record turntable means situated within said housing and adapted to hold and rotate a record;

motor means situated within said housing said motor means having a drive shaft for driving said turntable means;

transmission means for transmitting the driving motion of said motor means to said turntable means;

a portable energy source situated within said housing for driving said motor means;

regulating means for regulating the speed of said motor means;

connecting means for interconnecting said energy source and said regulating means with said motor means, and forming an energy transmission circuit thereby;

switching means situated within said housing for opening and closing said circuit;

a record-playing needle for following the sound characteristics of a record;

means for holding and supporting said needle;

sound reproducing means linked to said needle and amplifying the sound characteristics followed by said needle;

and pivoting means associated with said holding and supporting means for permitting said needle to be variable positioned, said pivoting means being situated within said housing and wherein said speed regulating means comprises a resistance wire an L-shaped control rod having one end movable along said wire and in electrical contact therewith, a control knob secured to the other end of said control rod for actuating said rod and varying the position of same with respect to said wire, and resilient mounting means for mounting said wire to maintain electrical contact between said wire and control rod.

4. The invention as defined in claim 3, including a spring member connected to said resistance wire for assuring electrical contact between said control rod and said wire.

5. The invention as defined in claim 4, including means for mounting one end of said wire to a resilient terminal connected to said energy source, and a slidable eyelet for fastening the other end of said wire within a hole of said means for mounting said wire.

6. A phonograph record player comprising, in combination, a housing for enclosing and supporting said phonograph;

a record turntable means situated within said housing and adapted to hold and rotate a record;

motor means situated within said housing said motor means having a drive shaft for driving said turntable means;

transmission means for transmitting the driving motion of said motor means to said turntable means;

a portable energy source situated within said housing for driving said motor means;

regulating means for regulating the speed of said motor means;

connecting means for interconnecting said energy source and said regulating means with said motor means, and forming an energy transmission circuit thereby;

switching means situated within said housing for opening and closing said circuit;

a record-playing needle for following the sound characteristics of a record;

means for holding and supporting said needle;

sound reproducing means linked to said needle and amplifyfing the sound characteristics followed by said needle;

and pivoting means associated with said holding and supporting means for permitting said needle to be variable positioned, said pivoting means being situated within said housing and including an arm fixed to said needle holding and supporting means for pivoting same, said arm being secured to said pivoting means for pivoting same, said arm being secured to said pivoting means so that said needle is movable in planes parallel and perpendicular to the plane of said turntable, and a lever fixed to said needle holding and supporting means to provide means for gripping same and moving same into playing as well as stowed positions, said lever being L-shaped and including an arm pivot shaft fixed to said housing to provide pivoting action to said arm; an arm support rotatable about said arm pivot shaft for supporting said arm; means for securing said arm to said arm support and to said arm pivoting shaft; and means associated with said arm and said arm support for maintaining pressure on said arm to retain said needle in contact with said record when in playing position, said arm being pivotable with respect to said arm support in a plane perpendicular to the plane wherein said arm support is rotatable about said arm pivot shaft.

7. The invention as defined in claim 6, in which said means for securing said arm to said arm support and to said arm pivoting shaft comprising an L-shaped pin.

8. A phonograph record player comprising, in combination, a housing for enclosing and supporting said phonograph;

a record turntable means situated within said housing and adapted to hold and rotate a record;

motor means situated within said housing said motor means having a drive shaft for driving said turntable means;

transmission means for transmitting the driving motion of said motor means to said turntable means;

a portable energy source situated within said housing for driving said motor means;

regulating means for regulating the speed of said motor means;

connecting means for interconnecting said energy source and said regulating means with said motor means and forming an energy transmission circuit thereby;

switching means situated within said housing for opening and closing said circuit;

a record-playing needle for following the sound characteristics of a record;

means for holding said needle, said means supporting sound reproducing means linked to said needle and amplifying the sound characteristics followed by said needle;

mounting means located above said turntable for mounting said motor means and said energy source;

and pivoting means associated with said holding means for permitting said needle to be variable positioned, said pivoting means being situated within said housing and wherein said sound reproducing means includes a membrane linked to said needle and vibrating in accordance with the needle movement in the direction perpendicular to the plane of said turntable means, said membrane being held by said needle holding means comprising a housing having oppositely located open and closed sides, said membrane being held at the open side and said needle being held at the closed side of said housing, the needle holding means including an L-shaped amplifying lever, one end of said amplifying lever acting upon said membrane and the other end of said amplifying lever terminating in a circular loop, and a needle carrier pivotably supported by said needle holding means for carrying and securing said needle, said needle carrier having a circular portion to which said circular loop is fastened.

9. A phonograph record player comprising, in combination, a housing for enclosing and supporting said phonograph and record to be played by same; means for partitioning said housing into a first lower level and a second upper level;

turntable means situated within said first level and adapted to support and rotate said record;

motor means situated within said second level and supported by said partitioning means for driving said turntable means;

transmission means for transmitting the driving motion of said motor means to said turntable means; and a power source situated within said second level and supported by said partitioning means for driving said motor means;

sound reproducing means in said housing for amplifying the sound characteristics of said record;

said means for partitioning said housing into said second upper level having a support for said motor means and said power source, said support extending partially over said record turntable;

a record retaining member extending from said partitioning means in contact only with the upper surface of said record at a point displaced from the record center and radially opposite to the location of the point at which said sound reproducing means contacts said record, said retaining member counterbalancing the pressure of said sound reproducing means upon said record and said record retaining member having a downward projection extending from a support on said partitioning means, said support extending partially over said turntable.

10. The invention as defined in claim 9, including regulating means for regulating the speed of said motor means, said regulating means being situated within said second level and supported by said partitioning means.

11. The invention as defined in claim 9, including means associated with said housing and protecting said record when located in its playing position against damage due to dropping of said phonograph player, said record projected from said housing when located in playing position to facilitate insertion and removal of said record.

12. A phonograph record driving system with sound reproducing means comprising, in combination, a housing for supporting said driving ssytem;

a turntable for holding and rotating said record and having means for holding a transmission belt;

indexing means having a projection serving as a key whereby said turntable and record move with the same velocity;

a record retaining member in contact only with the upper surface of said record at a point displaced from the record center and radially opposite to the location of the point at which said sound reproducing means contacts said record, said retaining member counterbalancing the pressure of said sound reproducing means upon said record and said record retaining member having a downward projection extending from a support on said housing, said support extending partially over said turntable and forming a second level in said housing for supporting members of said driving system.

13. The invention as defined in claim 12, including motor means having a drive shaft with an end projecting from said motor means for driving said turntable, said drive shaft having means for holding a transmission belt; and a bearing collar for receiving the end of said drive shaft.

14. The invention as defined in claim 13, including a transmission belt connecting said drive shaft with said turntable.

15. A speed regulating means for a phonograph record driving motor comprising, in combination, a mounting base for mounting said speed regulating means;

a resistance wire connected in series with said motor:

an L-shaped conducting rod in electrical contact with said wire and slideably movable along said wire to introduce a variable amount of resistance in series with said motor and regulate the speed thereof;

means whereby electrical contact between said resistance wire and said L-shaped rod is securely maintained throughout the range of motion thereof.

16. The invention as defined in claim 15, including a first terminal connected to one end of said resistance wire and associated with said rod so that the latter is received by said terminal when sliding off said wire end and remains in electrical contact therewith.

17. The invention as defined in claim 16, including an eyelet for securing the other end of said resistance wire to said mounting base.

18. A phonograph record player comprising, in combination, a housing for enclosing and supporting said phonograph; mean for partitioning said housing into upper and lower levels;

a record turntable means situated within the lower level of said housing and adapted to hold and rotate a record;

motor means situated within the upper level of said housing, said motor means having a drive shaft for driving said turntable means;

transmission means for transmitting the driving motion of said motor means to said turntable means;

a portable energy source situated within the upper level of said housing;

regulating means for regulating the speed of said motor means, said regulating means being situated within said upper level;

said partitioning means supporting said motor means, said energy source and said regulating means;

said partitioning means forming said upper level and extending partially over said turntable;

connecting means for interconnecting said energy source and said regulating means with said motor means, and forming an energy transmission circuit thereby;

switching means situated within said housing for opening and closing said circuit;

a record-playing needle for following the sound characteristics of a record;

means for holding said needle;

sound reproducing means linked to said needle for amplifying the sound characteristics followed by said needle;

and pivoting means associated with said holding and supporting means for permitting said needle to be variable positioned, said pivoting means being situated within said upper level of said housing;

a record retaining member extending from said partioning means in contact only with the upper surface of said record at a point displaced from the record center and radially opposite to the location of the point at which said sound reproducing means contacts said record, said retaining member counterbalancing the pressure of said sound reproducing means upon said record and said record retaining member having a downward projection extending from a support on said partitioning means; said support extending partially over said turntable.

19. The invention as defined in claim 18 wherein said partitioning means comprises an L-shaped bracket located within said housing and substantially parallel to said turntable.

20. The invention as defined in claim 19 wherein said motor means, energy source, speed regulating means, and switching means are supported by said partitioning means fastenable to said housing.

21. The invention as defined in claim 18 including means for fastening said motor means to said mounting means, said fastening means comprising a strap capable of being snapped around said motor means and said mounting means and holding said motor means firmly in mounted position.

References Cited

UNITED STATES PATENTS

| | | | |
|---|---|---|---|
| 620,823 | 3/1899 | Andion | 274—29 |
| 1,311,300 | 7/1919 | Tonk | 274—25 |
| 1,419,505 | 6/1922 | Lau | 274—29 |
| 1,655,196 | 1/1928 | Parolini et al. | 274—25 |
| 2,310,545 | 2/1943 | Rieber | 274—39 |
| 2,670,210 | 2/1954 | Thompson | 274—9.2 |
| 2,780,466 | 2/1957 | Like | 274—9 X |
| 2,927,794 | 3/1960 | Carson | 274—9.2 |
| 2,988,365 | 6/1961 | Favaro | 274—9 |
| 3,006,651 | 10/1961 | Burdick et al. | 274—1 |
| 3,079,159 | 2/1963 | King et al. | 274—14 |
| 3,086,297 | 4/1963 | Kantrowitz | 274—14 X |
| 3,222,073 | 12/1965 | Degaetano | 274—9 |
| 3,256,024 | 6/1966 | Mason | 274—9 |
| 3,281,152 | 10/1966 | Warutani | 274—1.7 |
| 3,319,965 | 5/1967 | Wolf | 274—39.1 |
| 3,336,031 | 8/1967 | Ammon et al. | 274—9.2 |
| 3,382,604 | 5/1968 | Ryan | 274—9 |

HARRY N. HAROIAN, Primary Examiner

U.S. Cl. X.R.

274—9